Nov. 1, 1966  R. R. LOGAN  3,282,625
CONVERTIBLE VEHICLE SEAT AND BED APPARATUS
Filed Oct. 14, 1965  2 Sheets-Sheet 2
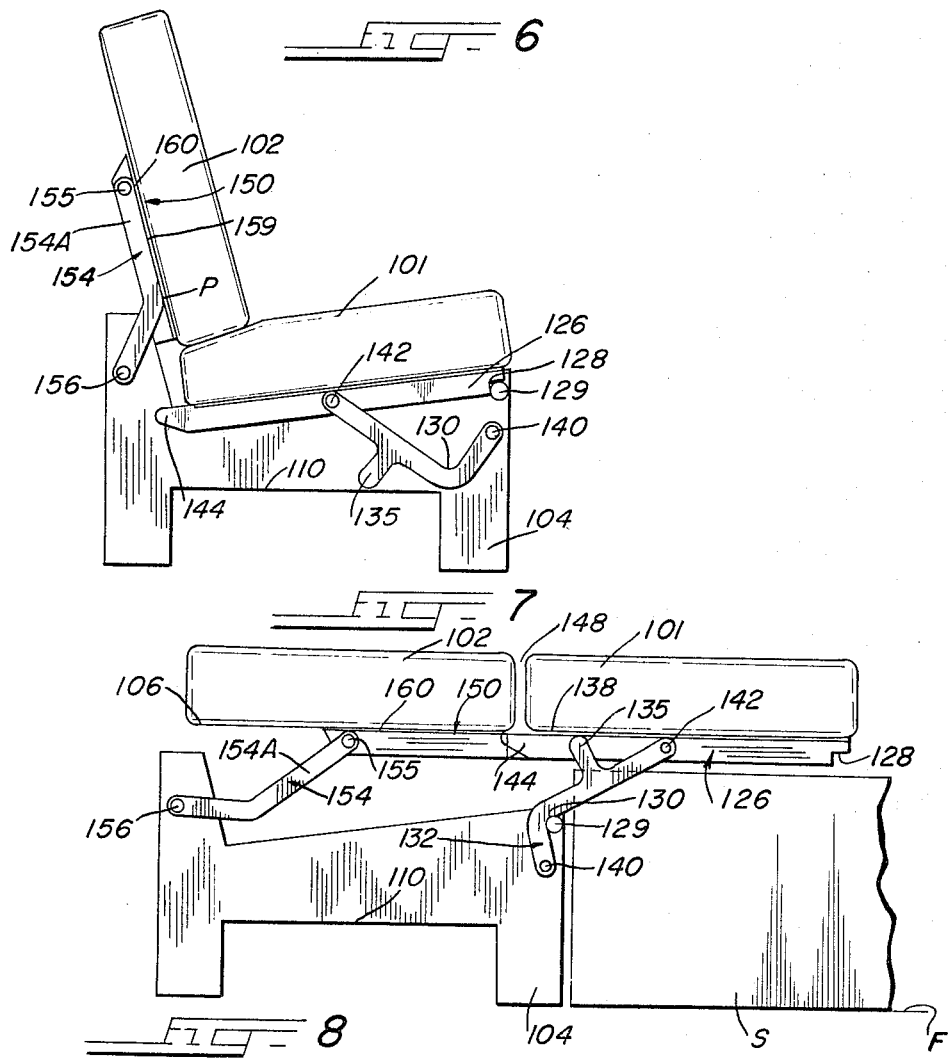
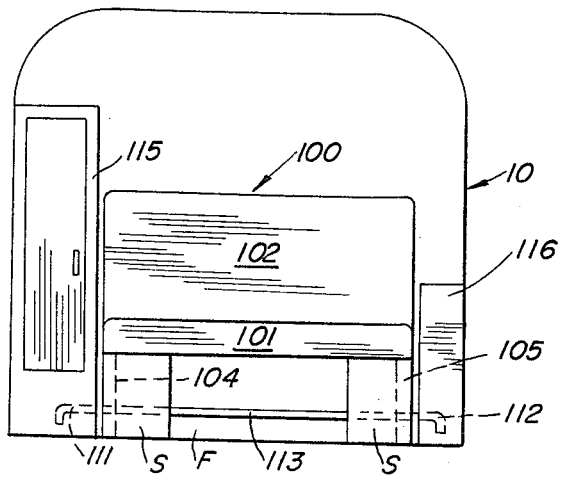
INVENTOR.
REUBEN R. LOGAN United States Patent Office 3,282,625
Patented Nov. 1, 1966

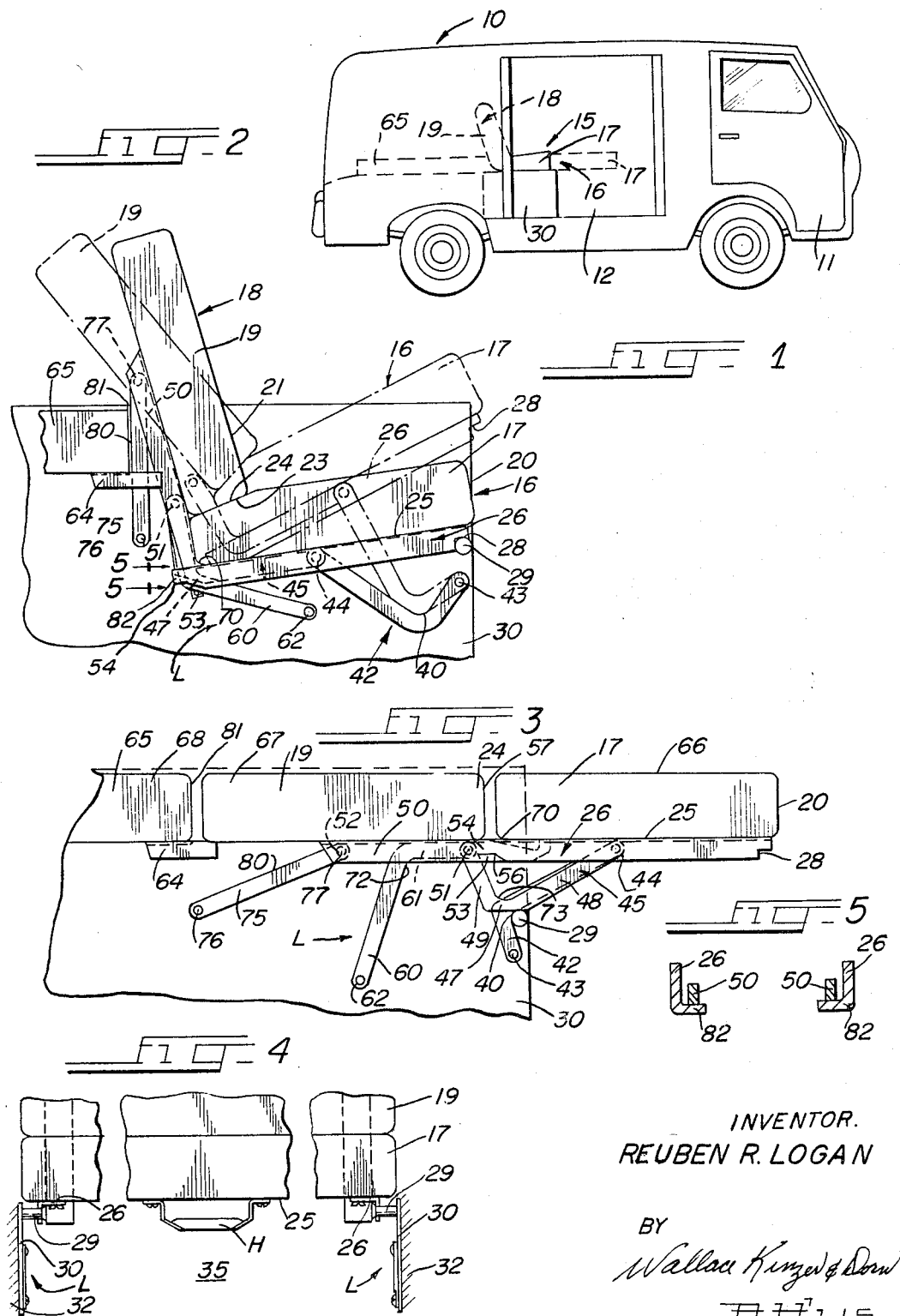

3,282,625
CONVERTIBLE VEHICLE SEAT AND BED
APPARATUS
Reuben R. Logan, 1301 San Mateo SE.,
Albuquerque, N. Mex.
Filed Oct. 14, 1965, Ser. No. 496,049
6 Claims. (Cl. 297—65)

This invention relates to apparatus convertible into either a seat or a bed and more particularly to such convertible apparatus for use in vehicles.

The present invention is particularly directed to convertible seat and bed apparatus for camper vehicles wherein accommodations are provided for camping equipment and storage of travel gear or the like. Usually, the camper vehicle is equipped to seat a number of persons on a rear seat and the rear seat is convertible to provide a sleeping accommodation within the vehicle body. Understandably, a premium is placed on efficient utilization of space within such a vehicle. Accordingly, an object of the present invention is to afford a new and improved convertible seat and bed apparatus that requires a minimum space and hence leaves a maximum of unencumbered space for storage of travel gear or other equipment.

From a safety standpoint, it is desirable that the convertible seat and bed apparatus be locked securely in either its seat position or its bed position to prevent an undesired shifting thereof, as, for example, during sudden deceleration or stopping acceleration of the vehicle. Thus, another object of the invention is a novel convertible seat and bed apparatus which is automatically locked in either its seat position or its bed position to prevent movement of the apparatus during operation of the vehicle.

It is preferable that the convertible seat and bed apparatus, particularly when used in conjunction with an optional cushion, accept a standard size of mattress to afford the customary amount of resting space. Heretofore, known commercially available convertible seat and bed devices usually have been too short to support a full size mattress, when in a bed position. In some instances, the convertible seat-beds have had such a long seat cushion that a passenger's legs would not comfortably bend over the front edge portion of the seat cushion. Such a long seat cushion renders the sitting position uncomfortable, especially during long periods of travel, and particularly for relatively short people. Accordingly, another object of the invention is to afford a more convenient and comfortable size of seat cushion by disposing the back rest cushion over the rear portion of the seat cushion in a convertible seat and bed apparatus. A further object of the invention is to afford increased length of cushion support for a mattress by having a front seat cushion movable forwardly from the position it occupies when in its seating orientation.

Another object of the invention is a novel support and linkage means for a convertible seat-bed which is automatic in operation and which is efficaciously mounted on vertical walls adjacent the outer edges of the seat and back rest portions of a convertible seat and bed apparatus.

Other and further objects of the present invention will be apparent from the following description and claims and are illustrated in the accompanying drawings which, by way of illustration, show a preferred embodiment of the present invention and the principles thereof and what is now considered to be the best mode contemplated for applying these principles. Other embodiments of the invention embodying the same or equivalent principles may be used and structural changes may be made as desired by those skilled in the art without departing from the present invention.

In the drawings:

FIG. 1 illustrates a camper vehicle including a convertible bed and seat apparatus;

FIG. 2 is an enlarged side elevational view of a bed and seat apparatus, in its seat orientation, constructed in accordance with the preferred embodiment of the invention;

FIG. 3 illustrates the convertible seat and bed apparatus of FIG. 2 oriented in a bed position;

FIG. 4 is an end elevation view which illustrates the unencumbered storage capacity afforded by the convertible seat and bed apparatus of the present invention;

FIG. 5 is a bottom detail view of one side of seat and back braces interlocked when the device is in its bed orientation;

FIG. 6 illustrates another embodiment of the invention having a modified linkage mechanism;

FIG. 7 illustrates the embodiment of FIG. 6 in a bed orientation; and

FIG. 8 is a cross-sectional view of a camper vehicle having a convertible bed and seat apparatus.

Referring now to the drawings, and more particularly to FIG. 1, there is illustrated a conventional camper vehicle 10 having a front door 11 and a pair of middle doors 12. The middle doors 12 are open to expose the interior of the center portion of the vehicle 10, containing a convertible seat and bed apparatus 15. The convertible seat and bed apparatus 15 includes a seat means 16 having a cushion 17 and a back means 18 having a cushion 19. When the back cushion 19 is oriented in the position shown in FIGS. 1 and 2, the apparatus 15 constitutes a passenger seat with a seating cushion 17 and a back cushion 19 inclined relative to each other in a conventional manner.

An important aspect of the present invention is that the distance from the front surface 20 of the seat cushion 17 to the front edge 21 of the back cushion 19 is preferably about seventeen inches in length, thereby affording a more comfortable length of seat than heretofore has been the practice. Heretofore, the convertible seat and bed mechanism of the prior art have usually had a twenty-one inch dimension between the front edge of the seat cushion and the surface of the back cushion which dimension was, in many instances, decidedly uncomfortable to persons having short legs. It should be noted that in the present invention, the bottom portion 24 of the back cushion 19 is disposed over the rearward portion 23 of the seat cushion 17, thereby reducing the effective length of the seat cushion 17 while it is oriented as a seat. The full length of the seat cushion 17 is, however, utilized advantageously when in the bed orientation, as illustrated in FIG. 3.

Another important aspect of the present invention is that of locking the seat means 15 against an unwanted forward movement from the position shown in FIG. 2 upon a sudden stopping or other deceleration of the camper vehicle 10. For this purpose, it is preferred that each of a pair of spaced bottom angle braces 26 secured to the bottom surface 25 of the seat cushion 17 be provided at their forward ends with notches 28 for locking and supporting engagement with studs 29. The locking studs 29 are of substantial size and length and are fixedly secured to individual supporting means 30, FIG. 4, which are preferably in the form of steel plates secured by suitable fastening means (not shown) to vertical walls 32. Either one or both of the walls 32 may be adjacent an outer wall of the vehicle, although the present invention is not so limited. As best seen in FIG. 4, it is preferred that the supporting plates 30 be located at the outer edges of the respective seat and back cushions 17 and 19.

Thus, a free and unencumbered space 35, FIG. 4, exists between the floor F of the vehicle 10 and the under surface 25 of the seat means 15, FIG. 1, except for the angle braces 26 and a small handle H secured by fasteners to the underside of the seat cushion 17. Heretofore, this storage space 35 has been encumbered by a series of supporting braces and linkages, the braces extending from the floor to the bottom of the seat cushion. As will be brought out in more detail hereinafter, a supporting linkage L for the seat and bed apparatus 15 is also located at the extremities of the seat and back cushions 17 and 19 adjacent the supporting plates 32 to afford the unencumbered space 35 extending the full width of the cushions 15 and 17.

The supporting linkage L also cooperates with the locking studs 29 to lock the seat cushion 17 and back cushion 19 against forward movement when they are in the bed orientation, as best seen in FIG. 3. For this purpose, the support studs 29 engage rounded corner portions 40, FIG. 3, of two cantilever supporting arms 42, there being one such arm 42 on each side of the cushion, preventing clockwise rotation of supporting arms 42. The cantilever supporting arms 42 are pivoted to the respective support plates 30 by pivot pins 43 and are secured by pivot pins 44 to the respective bottom angle braces 26, FIG. 3. The pivot pin connections 44 are approximately at the center of the seat cushion 17 and support the weight of the seat cushion 17 and the weight of a person resting thereon.

Thus, it will be seen that the support studs 29 prevent any clockwise pivoting of the respective cantilever support arms 42 about the pivot pins 43, under the urging of the weight of a person on the cushion 17. Moreover, if the vehicle 10 were moving and brought to a sudden stop, the seat cushion 17 is prevented from moving forwardly due to its momentum by the same cantilever support arms 42, which are locked by the studs 29 against movement.

For the purpose of affording a supplementary support for the seat cushion 17, a pair of spaced, traveling ties 45, FIG. 3, are also secured to the angle brace 26 by the pivot pins 44. Each of the traveling ties 45 has a flat surface 47 between a pair of legs 48 and 49 for engaging the upper surface of a respective one of the supporting studs 29. The rearward legs 49 of the traveling ties 45 are secured to respective back angle braces 50 by pivot pins 51.

The back angle braces 50 are generally of the same construction as the seat angle braces 26 in that they are angles each having one side thereof secured to a cushion adjacent the outer edges thereof, as best seen in FIG. 4. As best seen in FIG. 3, the respective back angle braces 50 each extend from a rearward (or upper) end 52 forwardly to an elongated finger portion 54 formed at the rearward end of a respective one of the bottom angle braces 26. The finger portions 54 and 53 and the braces 26 and 50 are adapted to meet along a common line 56 beneath the respective cushions 17 and 19. The finger portions 54 and 53 of the braces 26 and 50 are thus interlocked to support the respective adjacent portions of their respectively opposite cushions 17 and 19.

As seen in FIG. 3, the forward end 24 of the back cushion 19 is supported by the leg portions 49 of the traveling ties 45 which have flat surfaces 47 supported on the studs 29. Further support for the forward end 24 of the back cushion 19 is also afforded by a pair of traveling arms 60, FIG. 3, each of which has an upper and now horizontal arm 61 in engagement with one of the angle braces 50. Each of the traveling arms 60 is mounted on a plate 30 by a pivot pin 62 and is connected at its other extremity to one of the braces 50 by one of the pivot pins 51.

When the seat cushion 19 is in the bed orientation of FIG. 3, the rearward end of the cushion 19 is supported by stationary brackets 64, which are preferably in the form of angles secured to the underside of a stationary cushion 65. The stationary cushion 65 is optional with the present seat and bed apparatus 15. The manner of supporting the stationary cushion 65, is not explained in detail herein and the cushion 65 may either be supported on a cover for the motor for rear engine camper type of vehicles or may be suitably secured in the vehicle in a conventional manner. In any event, the cushion 65 is supported at the height of bed orientation, thus, each of the top surfaces 66, 67 and 68 of the respective cushions 17, 19 and 65 may be disposed in a coplanar relationship to afford a horizontal and level bed surface.

When it is desired to shift the convertible seat and bed apparatus 15 from the bed orientation of FIG. 3 to the seat orientation of FIG. 2, the operator grasps the seat cushion 19 and lifts it upwardly while pushing downwardly and rearwardly on the forward edge 20 of the seat cushion 17. The seat cushion 17 moves downwardly and becomes inclined in the position shown in FIG. 1. In this position the notches 28 on the respective spaced angle braces 26 are in locking engagement with the studs 29 and support the weight of the seat cushion 17 and a persons sitting thereon. The traveling arms 60 and traveling ties 45 rotate into a position wherein the rear corner 70 of the seat cushion is nested in their respective bend portions 72 and 73. Thus, the rear portion 70 of the seat cushion 16 is held and tied mechanically by the traveling arms 60 and traveling ties 45 to the respective back angle braces 50.

The angle braces 50 are held against downward movement by back support arms 75 which are secured by pivot pins 76 to the respective plates 30 and by pins 77 to the now upper ends of the respective angle braces 50. As seen in FIG. 2, the pivot pins 76 and 77 for the back support arms 75 are in a straight line and in a vertical orientation to resist downward forces on the back means 18. Also, because the traveling arms 60 and the traveling ties 45 are secured to back braces 50, the rearward portion of the seat means 16 is also held against downward movement.

The rearward edges 80 of the respective seat back support arms 75 engage the optional cushion 65 at the forward edge portion 81 and thereby limit rotation of the seat back 18 in a rearward direction without a simultaneous upward movement of the seat bottom 17, as seen in phantom lines in FIG. 2, when changing from a seat orientation to a bed orientation.

The back means 18 is prevented from clockwise rotation around its lower portion 24, as seen in FIG. 2, by engagement of the finger portions 53, FIG. 5, of the back braces 50 with inwardly bent hook portions 82, FIG. 5, formed at the terminal near ends of the respective seat braces 26. Hence, when a force is exerted on the back cushion 19 tending to pivot the cushion 19 clockwise about its lower end 24, the end 53 of the braces 52 move into engagement with the respective hooks 82 on the seat braces 26 and prevent rotation of the seat cushion 18 in a clockwise direction, as seen in FIG. 2.

When it is desired to convert the seat into a bed, an operator need merely grasp the handle H and pull upwardly on the handle H to lift the notched portions 28 from the support studs 29, whereupon the seat cushion 17 is free to be pulled forwardly. The seat cushion 17 moves simultaneously upwardly and forwardly as its cantilever arms 42 pivot about the pins 43. The lower end 24 of the seat cushion 18 also moves upwardly as the traveling arm 60 pivots in a clockwise direction about its pivot pin 62 from the position shown in FIG. 2 to that shown in FIG. 3.

Another embodiment of the convertible seat and bed mechanism, illustrated in FIGS. 6–8, employs a simplified linkage mechanism for supporting a seat cushion 101 and back cushion 102. The cushions 101 and 102 are preferably six to seven feet in length between spaced side supports 104 and 105, FIG. 8, thereby enabling persons to sleep lengthwise and eliminating the need for the stationary cushion 65, shown in FIG. 3. Manifestly, the stationary cushion 65 may also be employed, if desired, in connection with the cushions 101 and 102 to permit people to sleep crosswise rather than lengthwise. If desired, a stationary bracket similar to the bracket 64, FIG. 2, may be provided beneath the lower, leftward end 106 of the cushion 102 to support the back cushion 102 when it is disposed in the bed orientation of FIG. 7.

A storage problem for long objects exists in conventional campers, particularly in rear engine campers such as the Volkswagen camper because of a lack of extended floor space area to store long awning poles or other long objects. The storage of long poles or the like is solved with the present invention by having the side supports 104 and 105 provided with large rectangular openings 110 through which may be inserted the opposed ends 111 and 112 of awning pole 113, FIG. 8. There is illustrated in FIG. 8, a cross-sectional view of a typical camper having a storage closet 115 forward of the awning pole 113 and at the left side of the convertible seat and bed mechanism. An arm rest 116 is disposed forwardly of the awning pole 113 and at the right hand portion of the convertible seat and bed mechanism 100, FIG. 8.

It will be recalled that the seat cushion 66, FIG. 2, pivots upwardly, as illustrated in dotted line in FIG. 2, when moving the cushion into either a seat orientation or a bed orientation. The seat cushion 101 moves in a similar manner and this feature is of particular advantage in the construction of the embodiment of the invention of FIGS. 6-8, wherein the storage containers or boxes S are resting on the floors F just forward of the side supports 104 and 105 at each side of the convertible seat and bed mechanism 100. In lieu of the storage containers S, luggage or other equipment may be stored adjacent the front edge of the seat cushion 101 when it is oriented in its seat position of FIGS. 6 and 8. The convertible bed and seat mechanism 100 can be converted to a bed without necessitating the removal of the luggage or the like since the seat cushion 101 moves upwardly and over the luggage during its movement to the bed orientation, as seen in FIG. 7. In a like manner, the seat cushion 101 moves from the position of FIG. 7 to the seat orientation of FIG. 6 over the luggage or storage boxes S.

Secured to the underside of seat cushions 101 are angle shaped members 126 similar to the angles 26 for the seat cushion 17. The angles 126 are also provided at the forward edges with notches 128 for seating against support posts 129 when the seat cushion 101 is in its seat position, FIG. 6. The support posts 129 are fixed to the respective side supports 104 and 105 and hold the convertible bed and seat mechanism 100 against sliding forwardly, i.e., rightwardly, FIGS. 6 and 7, during a sudden deceleration of the vehicle. The support posts 129 engage the right angle curvature 130 of support arms 132, which are similar to the support arms 42 of FIG. 2 hereinbefore described to lock the bed against forward movement. The support arms 132 differ from the support arms 42 in that they have spaced projection arms 135 disposed at right angles to a portion thereof. The projection arms 135 have a generally rounded corner adapted to engage the horizontal oriented portions 138 of the angles 126. The support arms 132 are mounted on pivot posts 140 secured to the respective side supports 104 and 105 and on pivot pins 142 secured to the seat angles 126. As the seat cushion support arms 132 pivot about pivot posts 142, the projection arms 135 move from the downwardly pointing positions of FIG. 6 to an upwardly pointing position of FIG. 7, to engage the angles 126 to hold seat cushion 101 against the weight of a person thereon.

The rearward portions 144 of the angles 126 are preferably straight and do not possess the hook portions 82 of the angles 26, as illustrated in FIG. 5. The rearward portions 144 of the angles 126 extend rearwardly across the gap 148, FIG. 7, between the cushions 101 and 102 to engage the underside of a portion of support angles 150 for the back cushion 102. The angles 150 are similar to the angles 50, hereinbefore described, and are secured at spaced locations along the edges of the underside of of the back cushion 102. The rearward portions of the angles 150 are attached to support arms 154 by pivot pins 155. The opposite ends of the back support arms 154 are pivotally mounted on pivot posts 156 secured to the respective side supports 104 and 105.

For the purpose of supporting the back rest cushion 102 against pivotal forces and downward movement thereof when the back rest cushion 102 is in the vertical orientation of FIG. 6, the arms 154 are formed with long, upper portions 154A which have long forward edges 159 in engagement with the sides 160 of the angles 150.

The upper portion of the seat cushion 102 is held from pivoting forwardly about the pivot pin 156 about the point P, FIG. 6, during declaration of the vehicle by the long length of engagement of the arms 154 with the support angles 150 to the pivot pins 155. Also it will be appreciated that the projection arms 135 also prevent forward movement of the seat cushions 101 because the pivoting arms in a clockwise direction on the posts 140 would further raise the projections 135, which is prevented by a person thereon and by the weight of the back cushion 102 on rearward portions 144 of the angles 126.

From the foregoing, it will be seen that the present invention affords a unique convertible seat and bed apparatus with a generally free and unencumbered area beneath the entire bed apparatus. Also, it will be seen that the apparatus is locked both in its seat position and in its bed position to prevent movement of the cushion which might cause injury to a person thereon during a sudden movement of the cushion.

Moreover, the linkages supporting the seat and bed mechanism are simple and inexpensive and automatic in operation thereby eliminating the manual manipulation of braces or locking supports, necessary in some prior art devices.

Hence, while preferred embodiments of the invention have been described and illustrated, it is to be understood that they are capable of variation and modification.

I claim:

1. In a convertible seat and bed apparatus for use in vehicles, seat means, brace means secured beneath said seat means and at opposite edges of said seat means, back means having brace means secured to seat means at the outer edges of said back means, said back means adapted to be inclined at an angle to said seat means to constitute a seat, said back means and seat means adapted to be arranged in coplanar relationship to constitute a bed, supporting means including a pair of spaced and vertical supports adapted to be secured to the vehicle adjacent the outer edges of said seat and back means leaving the space beneath said seat and back means substantially unencumbered, linkages means pivotally secured between the respective brace means and to said support means, and stop means to lock said seat and back means in the respective seat and bed orientations, said linkage means comprising: cantilever support arms pivotally mounted on the respective supports and pinned to said brace means on said seat means, said cantilever support arms engageable with said stop means when said seat means and back means are in a bed orientation to prevent further forward rotation of said seat means, traveling arm means secured to said brace means of said back means and pivotally mounted on the respective supports, said traveling arm means supporting said back means when in a bed position against downward forces thereon, traveling tie means pinned between the respective brace means of said seat means and back means, said traveling tie means having a generally right angle curvature to support said seat and cushion means when inclined to one another when in the seat orientation, and back support arms secured to the rearward and upper portions of said brace means for said back means, said back support arms being pivotally mounted on said supports and movable into a generally vertical relationship when said back means is in its seat orientation to support said back means against downward forces, and each of said respective brace means having portions thereon for interlocking engagement with one another.

2. In a convertible vehicle seat and bed apparatus of the kind comprising a seat cushion and a back cushion conjointly movable between a seat position in which said cushions are aligned approximately normal to each other and a bed position in which said cushions are disposed in adjacent substantially coplanar relation, a pair of support and guide linkages located at opposite side edges of said cushions and each comprising: a fixed support stud; a first brace mounted on said seat cushion and engaging said stud to support the free edge of said seat cushion when in said seat position; a traveling tie pivotally connected to both cushions and limiting the angular inclination of said cushions when in said seat position, said traveling tie engaging said support stud to support both cushions when in said bed position; and a second brace affixed to said back cushion, said braces interlocking with each other to maintain said cushions in fixed coplanar relation when in said bed position.

3. In a convertible vehicle seat and bed apparatus of the kind comprising a seat cushion and a back cushion extending between two fixed support walls and conjointly movable between a seat position in which said cushions are aligned approximately normal to each other and a bed position in which said cushions are disposed in adjacent substantially coplanar relation, a pair of support and guide linkages for mounting said cushions on said support walls, said linkages being located at opposite side edges of said cushions and each comprising: a fixed support stud mounted on and projecting inwardly from one of said support walls; a first brace mounted on said seat cushion and engaging said stud to support the free edge of said seat cushion when in said seat position; a traveling tie pivotally connected to both cushions and limiting the angular inclination of said cushions when in said seat position, said traveling tie engaging said support stud to support both cushions when in said bed position; a second brace affixed to said back cushion, said braces interlocking with each other to maintain said cushions in fixed coplanar relation when in said bed position; and at least two pivotal support arms, each pivotally connected at one end to said one support wall and each pivotally connected at the other end to a respective one of said braces, for supporting said cushions and guiding their movements between seat and bed positions.

4. In a convertible vehicle seat and bed apparatus of the kind comprising a seat cushion and a back cushion extending between two fixed support plates and conjointly movable between a seat position in which said cushions are aligned approximately normal to each other and a bed position in which said cushions are disposed in adjacent substantially coplanar relation, a pair of support and guide linkages for mounting said cushions on said support plates, said linkages being located at opposite side edges of said cushions and each comprising: a fixed support stud mounted on and projecting inwardly from a respective one of said support plates; a first brace mounted on said seat cushion and engaging said stud to support the free edge of said seat cushion when in said seat position; a second brace affixed to said back cushion, said braces interlocking with each other to maintain said cushions in fixed coplanar relation when in said bed position; and L-shaped traveling tie pivotally connected to both braces and limiting the angular inclination of said cushions when in said seat position, the apex of said traveling tie engaging said support stud to support both cushions when in said bed position; first and second support arms, each pivotally connected at one end to said one support plate, and pivotally connected at their other ends to said first and second braces, respectively, for supporting said cushions and guiding their movements between seat and bed positions; said first arm being of substantially L-shaped configuration and being aligned with said support stud to engage said stud and limit horizontal movement of said seat cushion upon movement of said seat cushion into a bed position.

5. In a convertible vehicle seat and bed apparatus of the kind comprising a seat cushion and a back cushion extending between two fixed support plates and conjointly movable between a seat position in which said cushions are aligned approximately normal to each other and a bed position in which said cushions are disposed in adjacent substantially coplanar relation, a pair of support and guide linkage for mounting said cushions between said support plates, said linkages being located at opposite side edges of said cushions and each comprising: a fixed support stud mounted on and projecting inwardly from a respective one of said support plates, a first brace mounted on said seat cushion and engaging said stud to support the free edge of said seat cushion and to prevent horizontal movement of said seat cushion away from said back cushion when said cushions are in said seat position; a traveling tie pivotally connected to both cushions and limiting the angular inclination of said cushions when in said seat position, said traveling tie engaging said support stud to support both cushions when in said bed position; a second brace affixed to said back cushion, said braces interlocking with each other to maintain said cushions in fixed coplanar relation when in said bed position; a pair of support arms, pivotally mounted on said one support wall and each pivotally connected to a respective one of said braces, for supporting said cushions, the configurations of said support arms requiring that said seat cushion be lifted clear of said support stud to enable movement of said cushions from seat position to bed position; and an additional support arm, pivotally connected to said one support plate and to said second brace, for supporting and guiding said back cushion.

6. In a convertible vehicle seat and bed apparatus of the kind comprising a seat cushion and a back cushion extending between two fixed support walls and conjointly movable between a seat position in which said cushions are aligned approximately normal to each other and a bed position in which said cushions are disposed in adjacent substantially coplanar relation, a pair of support and guide linkages for mounting said cushions on said support walls, said linkages being located at opposite side edges of said cushions and each comprising: a fixed support stud mounted on and projecting inwardly from one of said support walls; a first brace mounted on said seat cushion and engaging said stud to support the free edge of said seat cushion when in said seat position; at least two seat support arms, each pivotally connected at one end to said one support wall and each pivotally connected at the other end to a respective one of said braces mounted on said seat cushion, said seat support arms engaging said support stud to support said seat cushion when in a bed position, said seat support arms having portions extending rearwardly of said pivotal connection and engaging said seat braces to support said seat cushions rearwardly of said pivotal connection when said seat cushion is in a bed position; a second brace affixed to said back cushion, said braces interlocking with each other to maintain said cushions in fixed coplanar relation when in said bed position; and at least two pivotal back cushion support arms, each pivotally connected at one end to said one support wall and each pivotally connected at the other end to a respective one of said braces, for supporting said back cushions and guiding their movements between seat and bed positions.

(References on following page)

References Cited by the Examiner

UNITED STATES PATENTS

| | | | |
|---|---|---|---|
| 1,608,064 | 11/1926 | Henry | 297—65 X |
| 1,668,167 | 5/1928 | McKenna | 297—65 |
| 1,956,044 | 5/1934 | Ratzlaff | 297—65 |
| 2,576,343 | 11/1951 | Hibbard et al. | 297—65 |
| 2,622,659 | 12/1952 | Stelmack | 297—64 X |
| 2,655,197 | 10/1953 | Schofield | 297—64 X |
| 3,052,499 | 9/1962 | Wood | 297—64 |
| 3,162,481 | 12/1964 | Gaylor | 297—65 |
| 3,171,684 | 3/1965 | Carte | 297—65 |
| 3,193,324 | 7/1965 | Stock | 297—64 |
| 3,198,573 | 8/1965 | Betts | 297—65 X |

FOREIGN PATENTS

| | | |
|---|---|---|
| 449,677 | 7/1936 | Great Britain. |
| 55,765 | 9/1935 | Norway. |

FRANK B. SHERRY, *Primary Examiner.*

J. T. McCALL, *Assistant Examiner.*